United States Patent Office 3,430,137
Patented Feb. 25, 1969

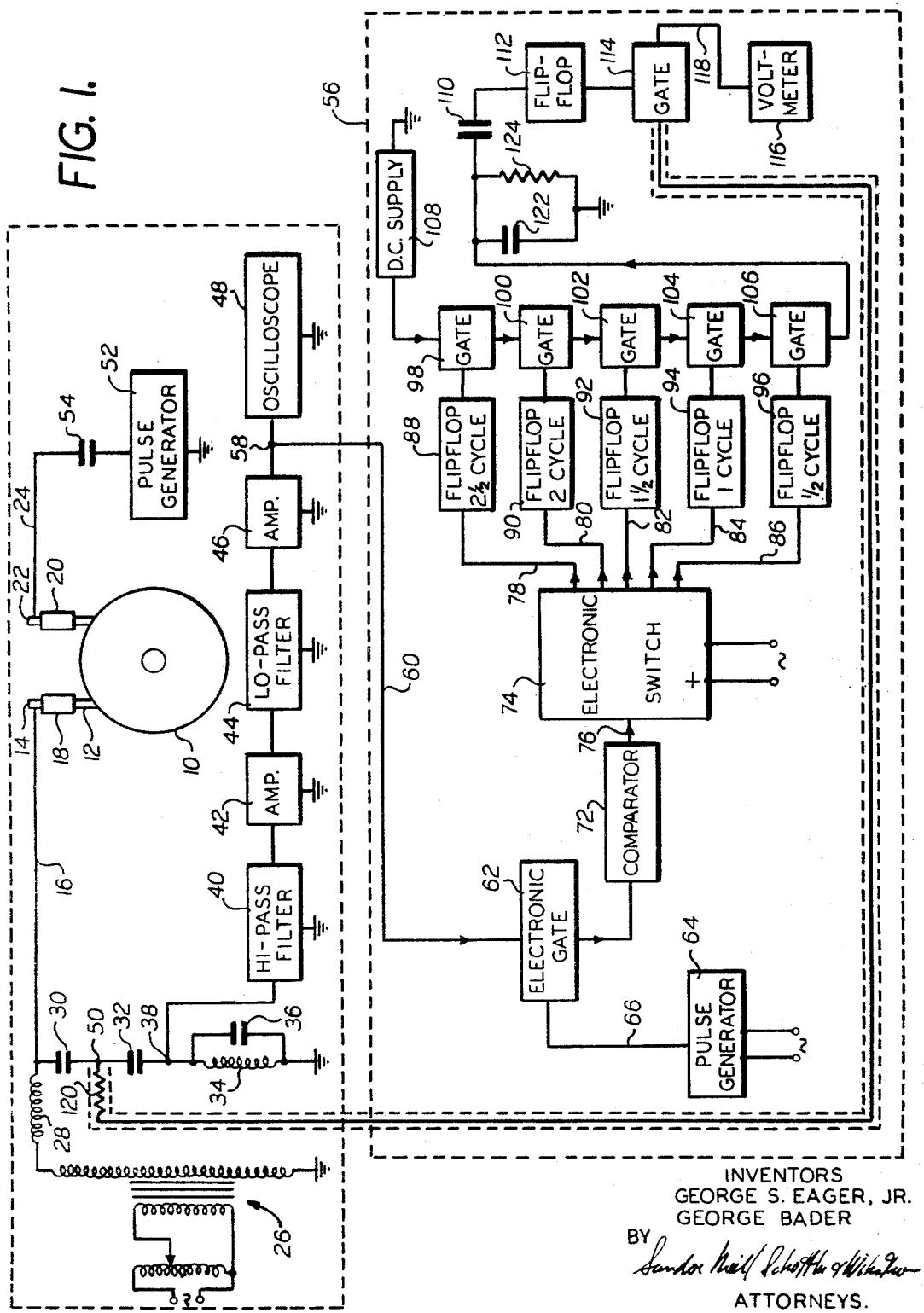

3,430,137
METHOD AND APPARATUS FOR AUTOMATIC MEASUREMENTS OF CORONA INCEPTION AND EXTINCTION VOLTAGES
George S. Eager, Jr., Upper Montclair, and George Bader, Edison, N.J., assignors to General Cable Corporation, New York, N.Y., a corporation of New Jersey
Filed July 10, 1967, Ser. No. 652,105
U.S. Cl. 324—54      8 Claims
Int. Cl. G01r 31/14

ABSTRACT OF THE DISCLOSURE

The method and apparatus is set forth for measuring discharges within voids in the insulation of power cable. A test voltage is applied to the cable and the amplitude thereof increased in predetermined manner. As the test voltage reaches the amplitude to initiate corona discharge in the cable voids, corona signals are detected. If and only if the corona signals appear on N consecutive ½ cycles of the applied test voltage, is the amplitude of the test voltage measured.

---

This invention relates to electrical cable and, more particularly, relates to a method and apparatus for automatic measurement of corona inception and extinction voltages in the insulation of power cables.

The service life of high voltage cables, particularly cables having a polyethylene or cross linked polyethylene insulation depends significantly on corona discharges which may appear in voids present in such cables. For this reason, measurement of corona inception and extinction voltages has received considerable attention by the art and now constitutes an important cable qualification test.

The corona inception voltage is the lowest value of the voltage at which corona discharges become detectable when the applied voltage is increased in a predetermined manner. The corona extinction voltage is the highest voltage during a decreasing voltage schedule at which the corona discharges become undetectable.

Since the corona inception and extinction voltages are determined on the basis of detectable corona signals, their values often depend on the sensitivity of the corona detector, that is, the detector capability for detecting corona signals. Additionally, in some cases, it is advantageous to measure the corona extinction voltage at different sensitivities of the corona detector. The relationship between the corona inception or extinction voltage as a function of corona detector sensitivity provides a guide to evaluation of the cable under test. For example, it has been found that when the corona inception or extinction voltage is low and does not change with increase in detector sensitivity, that the cable has many small voids or one large void. In contrast, when the corona inception or extinction voltages increase with a decrease in detector sensitivity, the cable has very few small voids.

A prevalent system for measurement of corona inception or extinction voltages uses an oscilloscope which is visually monitored by an operator. Thus, in such measurements, subjective interpretations often lead to errroneous measurements. In addition, most detectors in use are subject to intermittent interference particularly in cable manufacturing plants. For an extended discussion of discharge detection as well as a discussion of the difficulties of application in practical environments, reference is made to the article "Discharge Detection in Extruded Polyethylene Insulated Power Cables," Eager, G. S., and Bader, G, IEEE Transactions on Power Apparatus and Systems, vol. PAS–86, No. 1, January 1967, pp. 10–34 and to the discussion therein.

It is, therefore, a primary object of the present invention to provide an improved method and apparatus for automatic measurement of corona inception and extinction voltages which eliminates subjective interpretation and minimizes the effect of external interferences on measured results.

In accordance with this object, there is provided, in a preferred embodiment of this invention, apparatus useful in practice of the method disclosed which comprises means for applying a test voltage to the cable having an amplitude variation following a predetermined schedule. Means are provided to derive from the cable output pulse caused by discharges in insulation voids. A sample is taken of a portion of the applied waveform for a plurality of cycles of the applied waveform and if discharge is detected in each of the consecutive plurality of cycles, the applied voltage is automatically measured and recorded. To accomplish this method, a plurality of gates are employed for the sampling.

Thus, with this mehod and apparatus, operator interpretation is eliminated and the interference from external sources is minimized since the interference must occur on repetitive cycles which is unlikely.

Having briefly described this invention, it will be described in greater detail in the following portions of the specification, which may best be understood by reference to the accompanying drawings, of which:

FIG. 1 is a schematic diagram of a detector constructed in accordance with the present invention;

FIG. 2 is a plot of waveforms, wherein

Figure 2A:
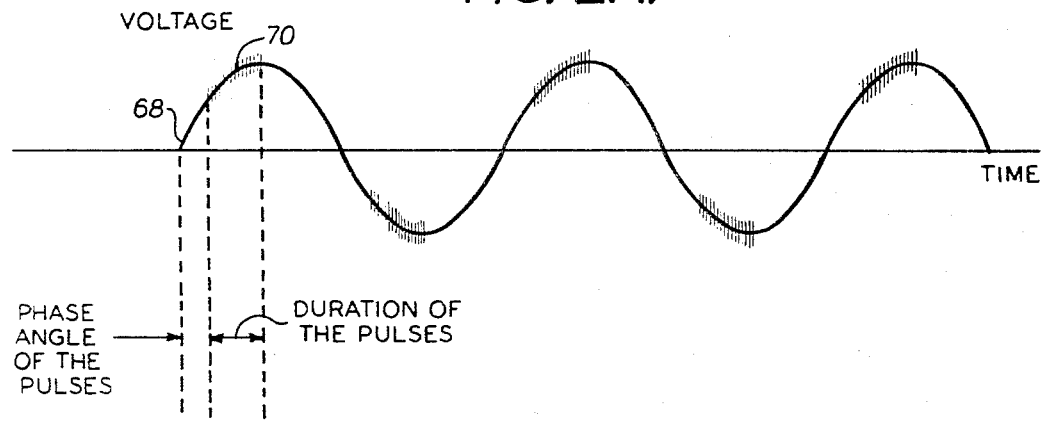
FIG. 2a is a plot of the applied test voltage.

In FIG. 1, there is shown an arrangement for measuring electrical discharges within the insulation of long lengths of power cable. Because of the long length, the cable is usually tested while on a reel 10. The end of the cable 12 is brought out and the conductor 14 thereof coupled to lead 16. A corona-free cable terminal 18 is provided. The other end of the cable is similarly provided with a corona-free cable terminal 20 having the conductor 22 thereof coupled to lead 24 to provide a source of calibration voltage as well be hereinafter explained. A high voltage power supply 26 is provided as schematically represented. The high voltage power supply generates a voltage of adjustable amplitude at the line frequency. In some applications, the control over the variation of voltage amplitude can be automatically controlled and programmed as is already known to the art. Generally, in tests of this nature, the voltage amplitude is increased gradually until corona discharges occur within voids of the cable. The circuitry is provided to derive therefrom an indication of such discharges. Similarly, to provide extinction voltage measurements, the amplitude of the applied current is decreased until corona signals are no longer detectable.

Inductance 28 is serially coupled between the cable and the power supply as a blocking inductance to minimize electrical noise which might come from the power supply and be introduced into the detecting circuit. A high voltage capacitor 30, a low voltage measuring capacitor 32 and the paralleled combination of inductance 34 and low voltage frequency stabilizing capacitor 36 is serially coupled between the power lead and ground and is often called a power separator filter. The power separator filter has two functions, one to attenuate the power frequency voltage without corona signal attenuation and the second, when corona appears in the cable, to produce damped oscillations with the frequency thereof substantially independent of the capacitance of the cable under test. The oscillation signals are derived at terminal 38 and processed through a high pass filter 40 of the R-C type to filter out residual power frequency voltage. The higher harmonics pass through the high pass filter, are amplified by the wide band amplifier 42 and are applied to an integrating network 44. The integrating network is a low pass filter of the R-C type which integrates the corona pulses to make the detector sensitive to charge instead of voltage. The advantages of detection of charge for accuracy of measurement is set forth in the article referenced previously in this specification. The signal is then amplified by amplifier 46 and may be displayed on an oscilloscope 48. The circuit as described thus far is typical of the circuits used in corona detection by those skilled in the art. In the convetnional circuit, the display on the oscilloscope is observed by an operator. Thus, as the voltage is increased, the oscilloscope will display signals derived from discharges with the voids in the cable insulation. This voltage is the corona initiation voltage. The voltage may be measured by a volt meter coupled to terminal 50. In order to calibrate the corona detector, a pulse generator 52 feeding the cable through a high voltage calibrating capacitor 54 is usually employed. The product of the voltage amplitude of rectangular pulses times the capacitance of capacitor 54 provides the calibrating charge value. When the operator detects corona signals, the applied voltage amplitude is measured. However, the evaluation or interpretation is subjective and, thus, subject to error. In addition, it has been found that in operating plants, the intermittent interference caused by other electrical equipment obscures an accurate corona signal display and leads to erroneous test data.

To overcome these objections, a detector 56 is provided. The amplified signals are applied via junction 58 and lead 60 to the detector for processing thereby. The signals are applied to an electronic gate 62 which is triggered by a pulse generator 64 through lead 66. The pulse generator is tied to the line frequency as indicated and, thus, triggers the gate synchronously with the line voltage. The phase of the pulses produced by the pulse generator with respect to the line is adjustable. In addition, the pulse width is adjustable.

Figure 2B:
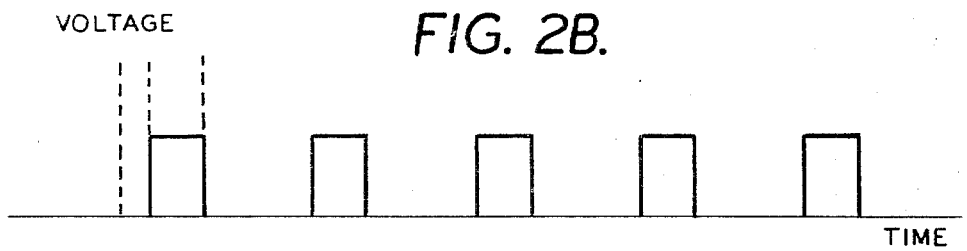
FIG. 2b is a plot of the gating voltage with the same time base for explanation of the correlation therebetween.

To assist in explanation of the signal gating, reference now will be made simultaneously to FIGS. 1 and 2. It is well established that corona in a cable insulation appears in the first quarters of positive and negative half cycles of power frequency voltage as is illustrated in FIG. 2a, wherein waveform 68 indicates the applied power frequency and the pulses 70 superimposed thereon indicate corona discharge. The gating pulses are adjusted as to phase and duration as indicated by the waveform in FIG. 2b so that they will pass the significant corona signals. Thus, during the remainder of the electrical cycle, electrical interference signals are blocked off. This in itself is a considerable help in eliminating disruption of measured results by electrical interference since the incoming signals is limited to the signal containing the useful data. The gated signals are applied to a comparator 72 which will pass only those pulses having an amplitude exceeding a predetermined value. As explained above, the amplitude of the corona pulses applied to the comparator is proportional to the charge supplied to the voids due to corona discharge. Thus, adjustment of the comparator provides a means of preselecting the sensitivity in picocoulombs of the detector. In most installations, it is preferable that this level be adjustable so as to permit variation of sensitivity for various applications.

The pulses pased by comparator 72 are processed by an electric switch 74 synchronized, as indicated, to the power frequency so that at each ½ cycle, the input over lead 76 is switched in sequence to output leads 78, 80, 82, 84 and 86. It will here be noted that the number of output circuits can be varied dependent on the desired confidence of measurement and the 5 output leads selected are exemplary of a typical detector useful in commercial testing. The output lines are tied to flip flop circuits 88–96 respectively which react to an input pulse (either positive or negative) to produce an ouput pulse of predetermined magnitude and duration. The pulse output of the flip flops are related to the number of flip flops utilized. In the circuit illustrated, flip flop 88 produces a pulse having a duration of 2½ cycles of the power frequency voltage. Flip flop 90 produces an output pulse of 2 cycles; flip flop 94, 1½ cycles; flip flop 94, 1 cycle and flip flop 96, ½ cycle. Each flip flop is tied to and triggers an electronic gate 98–106 respectively. The gates are serially coupled with a DC source 108 which produces a rectangular pulse shaped by capacitor 110 to a short positive pulse which triggers flip flop circuit 112. The flip flop circuit 112 produces an output pulse with a duration of 1 cycle of power frequency voltage which opens an electronic gate 114 for this period of time. During the time that gate 114 is open, a recording voltmeter 116 is coupled via lead 118 and resistor 120 to terminal 50. The resistor 120 permits the power frequency to pass to the voltmeter but attenuates the smaller amplitude corona signals. The function of the voltmeter is the recording of the applied test voltage but is preferably tied to terminal 50 to use the power separator filter as a voltage divider. A pulse smoothing filter consisting of capacitor 122 and resistor 124 is preferably included for the shaping effect on the pulses produced by the voltage source 108 and gates 98–106.

Having explained the relationship of the circuit components, the operation will now be explained. To measure corona inception voltage, the voltage amplitude of the power supply 26 is increased at a predetermined rate. Typically, the power supply may be increased at the rate of 10 kv. per second up to a predetermined limit. If corona appears at an intermediate value of the applied voltage, it will appear on all positive and negative consecutive ½ cycles of voltages above the inception voltage. The signals indicative of corona discharge are then applied through gate 62 and those exceeding the magnitude selected pass through comparator 74. The first signal is applied through switch 74 to flip flop 88. This flip flop opens gate 98 for 2½ cycles (5 × ½ cycle). On the next ½ cycle, the signal is processed to open gate 100 and, thus, sequentially to open gates 102, 104 and 106.

The reason for the repetitive application of signals indicative of corona discharge is to eliminate the possible interference from external sources. Thus, if a spurious signal simulated a corona discharge signal, it might trigger several of the gates. However, it is extremely rare that the spurious signal would be applied for 5 consecutive ½ cycles. Thus, this detector is resistant to erroneous measurement attributable to external signals. Similarly, another cause of disturbance are discharges in the high voltage portion of the measuring circuit which appear only at one polarity of the high voltage supply. Again, this circuit is resistant since it requires signal appearance at sequential ½ cycles for operation. The confidence level of the circuit may be augmented by additional pluralities of gates. Also, in many cases, it will be tolerable to use fewer gates. In general, for any plurality of gates, the first energized gate must produce a pulse of N times ½ cycle when N is equal to the number of gates serially connected.

If the corona discharge signal appears in the consecutive 2½ cycles of the applied test voltage, all of gates 98–106 will open and the pulse source 108 will trigger flip flop circuit 112 which in turn will open gate 114 connecting the recording voltmeter 116 to terminal 50 to record the amplitude of the applied test voltage. Since the flip flop circuit 112 opens the gate for only a ½ cycle of the power frequency voltage, the recorded voltage is not disturbed by continued increase of the applied test voltage.

For this measurement, the flip flop 112 is arranged to be sensitive to a positive pulse.

For measurement of corona extinction voltage, the flip flop circuit 112 is adjusted to be sensitive only to negative pulses. When the applied test voltage exceeds the corona level, gates 98–106 will open. However, the applied pulse to the flip flop 112 is a positive input pulse to which the flip flop is not sensitive. However, as the test voltage is decreased for measurement of extinction voltage, an amplitude will be reached to which corona discharge will disappear. At this time, gates 98–106 will close, resulting in a negative pulse applied to flip flop 112 as capacitor 110 is discharged, tripping the flip flop circuit to open gate 114 for recording of the test voltage at the extinction level.

Thus, in the detector circuit of the present invention, measurements are made automatically, eliminating interpretative decisions by an operator. Since the circuit is resistant to erroneous measurements because of external signals, accuracy is improved. Repetitive measurements may be made at different sensitivity levels to assist in the evaluation of the type of fault in the cable. We have found that if the measured corona inception or extinction voltage does not change with change in detector sensitivity and that if the corona inception or extinction voltage is low, the cable has many small voids or one large void. However, when the corona inception or extinction voltages increase, with decrease in detector sensitivity, the cable has few small voids. This fact is of considerable use in many applications.

Figure 3:
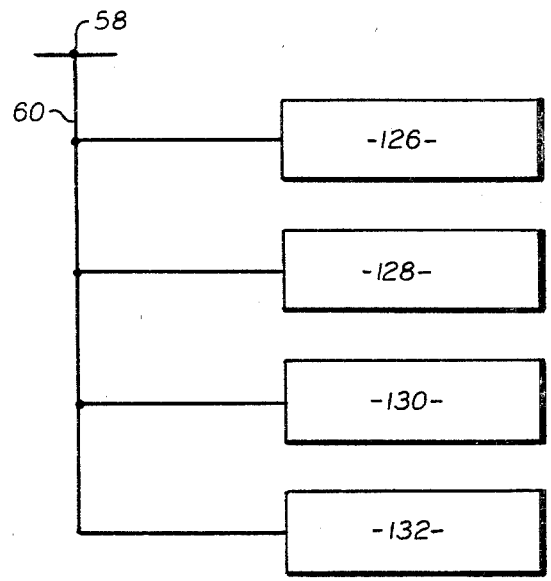
FIG. 3 is a block diagram of another embodiment of the present invention.

As an alternative to sequential measurement, the circuit shown in FIG. 3 may be employed in which the derived signal from terminal 58 is applied over lead 60 to a plurality of detectors 126, 128, 130, 132, each of which is identical to the detector 56 in FIG. 1 but is adjusted to different sensitivities. With this circuit, a single measurement can provide the desired information both as to the initiation and extinction voltages and the variation with detector sensitivity.

What is claimed is:

1. A detector for recording the amplitude of a test voltage when the test voltage produces a low amplitude signal superimposed thereon and repeated at the same position of each ½ cycle of the test voltage which comprises a plurality of N-gates, means for detecting said superimposed signal, coupling means connected to said detector means for applying said signal sequentially to each of said gates for each subsequent ½ cycle of said test voltage, said first of said gates being responsive to the application of said signal voltage to open said gate for $N/2$ cycles, the remaining gates each being responsive to the application of said signal thereto to open for $$\frac{N-M}{2}$$

cycles, where M is the gate position less 1, a signal source, a voltmeter, and a test gate means for coupling said voltmeter to the test voltage, said gates being serially coupled with said signal source and with said test gate means to form a series circuit, said test gate means being responsive to completion of the series circuit by the opening of said N-gates to complete a circuit coupling said voltmeter to said test voltage for measurment thereof.

2. A detector in accordance with claim 1 which includes a signal gate synchronized with said test voltage to apply signals to said detector only during the positive-going and negative-going portion of said test voltage.

3. A detector in accordance with claim 1 in which said signal coupling means includes a comparator to pass signals only exceeding a predetermined amplitude to said gates, thereby to enable adjustment of detector sensitivity.

4. A detector in accordance with claim 1 in which said coupling means comprises an electronic gate synchronized with the frequency of said test voltage to couple said signals in sequence to the respective gates of said N gates.

5. A detector in accordance with claim 4 which includes N flip flop circuits to receive the signals applied sequentially from said electronic gate and in response thereto to generate an output signal applied to a respective gate to change the state thereof.

6. The method of testing the corona initiation voltage in insulated power cable which consists of applying thereto an alternating test voltage at an increasing amplitude, detecting said test voltage applied to said cable along with any corona discharge signals which may occur, sampling the first and third quarter of each cycle of said test voltage to detect the existence of said corona discharge signals and measuring the value of said applied test voltage only after the corona discharge signal has appeared on each of a predetermined consecutive number of ½ cycles of said test voltage to determine the corona initiation voltage of said cable.

7. The method in accordance with claim 6 which includes the steps of measuring said test voltage only when the corona signal exceeds a predetermined amplitude.

8. The method in accordance with claim 7 which includes the steps of measuring the test voltage for different values of said predetermined amplitude to evaluate the type of void in said power cable insulation.

References Cited

UNITED STATES PATENTS

| | | | |
|---|---|---|---|
| 3,212,010 | 10/1965 | Podlesny | 328—136 XR |
| 3,327,225 | 6/1967 | Schell | 307—269 XR |
| 3,370,227 | 2/1968 | Bader et al. | 324—54 |
| 3,374,428 | 3/1968 | Eager et al. | 324—54 |

RUDOLPH V. ROLINEC, *Primary Examiner.*

G. R. STRECKER, *Assistant Examiner.*

U.S. Cl. X.R.

328—151; 307—242